United States Patent
Becht

[11] 3,925,955
[45] Dec. 16, 1975

[54] STAPLE FOR LIGHT GAUGE METAL PIERCING

[75] Inventor: Carl T. Becht, Cincinnati, Ohio

[73] Assignee: Senco Products, Inc., Cincinnati, Ohio

[22] Filed: Aug. 16, 1973

[21] Appl. No.: 388,893

[52] U.S. Cl. .................... 52/758 D; 52/376; 85/49
[51] Int. Cl.² ..................... F16B 5/00; F16B 15/00
[58] Field of Search ........ 85/49, 13, 30, 10 F, 10 R, 85/31, 26; 29/432, 526; 52/758 D, 376

[56] References Cited
UNITED STATES PATENTS

| | | | |
|---|---|---|---|
| 1,675,226 | 6/1928 | Munroe et al. | 52/376 X |
| 2,521,019 | 9/1950 | Percoco | 85/49 |
| 2,988,854 | 6/1961 | McKinley | 85/31 X |
| 3,473,430 | 10/1969 | Niedecker | 85/49 |

FOREIGN PATENTS OR APPLICATIONS

| 410,788 | 6/1945 | Italy | 85/49 |
|---|---|---|---|

Primary Examiner—Ramon S. Britts
Attorney, Agent, or Firm—Melville, Strasser, Foster & Hoffman

[57] ABSTRACT

The application discloses a staple for piercing light gauge metal as, for example, for securing furring strips to a light gauge metal channel. The piercing ends of the staple have either their inside surfaces or their outside surfaces beveled, leaving a blunt point. The parameters of the bevels are set forth in detail. The effect of the point configuration is that the staple, instead of punching out slugs of the sheet metal, bends down tabs therefrom, and concurrently the staple legs are slightly deflected toward each other, in the case of an outside bevel, or apart from each other in the case of an inside bevel. The holding power of the staple in the light gauge sheet metal is greatly increased.

2 Claims, 2 Drawing Figures

U.S. Patent   Dec. 16, 1975   3,925,955
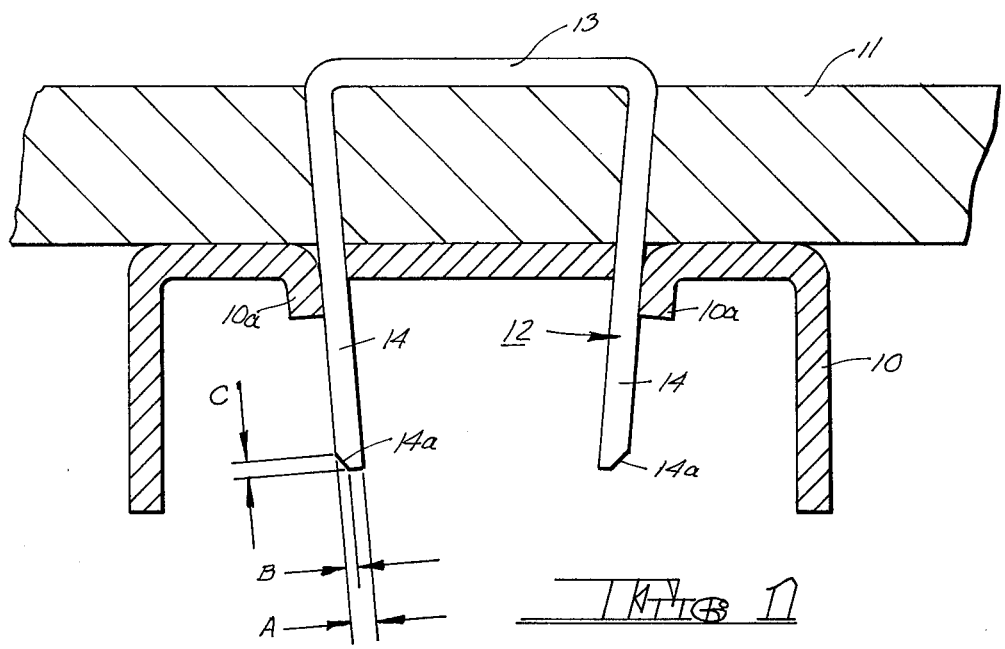
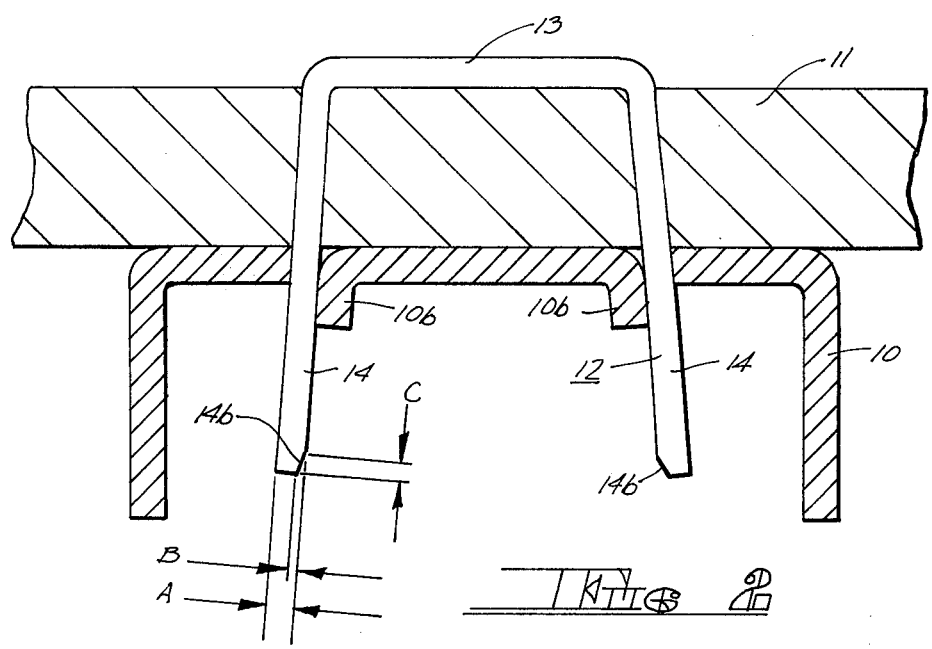

STAPLE FOR LIGHT GAUGE METAL PIERCING

BRIEF SUMMARY OF THE INVENTION

It is well known that with modern staple driving equipment, staples can readily be driven through fairly heavy gauge sheet metal. However, such staples have usually been driven into wood where the problem was to fasten a sheet metal member to a wooden member. Thus, it has always been the wooden member in which the staple had to have its holding power.

The situation is quite different, however, when a wooden member or the like is to be stapled to a sheet metal member, as, for example, a furring strip to a sheet metal channel or where two pieces of metal are to be stapled together. There the staple must develop its holding power in the sheet metal and this has heretofore not been accomplished successfully. As indicated above, the staple readily penetrates the sheet metal but in doing so it punches out slugs of the sheet metal and there is thus nothing but the thin gauge sheet metal circumference of the hole to hold the staple in place, and under these circumstances the holding power has been very poor.

According to the present invention, the piercing ends of the staple are given a particular configuration which causes them, when they are driven through the sheet metal, to bend down tabs of the sheet metal rather than to punch out slugs. At the same time, the legs of the staple are slightly diverted from the parallel, depending upon whether the particular configuration is given to the outside of the piercing ends or to the inside thereof.

By this arrangement, the holding power of the staple in light gauge sheet metal is very greatly enhanced.

BRIEF DESCRIPTION OF THE VIEWS OF THE DRAWING

FIG. 1 is a somewhat diagrammatical view in cross section of a furring strip or the like secured to a sheet metal channel by means of a staple wherein the bevel is applied to the outsides of the piercing ends of the legs.

FIG. 2 is a view similar to FIG. 1 where the bevel is applied to the insides of the piercing ends of the legs.

DETAILED DESCRIPTION

By way of preliminary comment, the term "light gauge sheet metal" is intended to cover, in steel, sheet metal of 13 gauge or under, and in aluminum, sheet metal of 10 gauge and under.

In the drawings, the numeral 10 represents a light gauge sheet metal channel and the numeral 11 represents an element to be stapled to the channel 10. This may be a furring strip of wood or a piece of masonite or even another piece of metal. Basically, the staple indicated generally at 12 has the conventional crown 13 and legs 14 which in the undriven condition of the staple are parallel.

According to the invention, the piercing ends of the staple are given a bevel indicated at 14a in FIG. 1 on the outsides of the piercing ends of the legs 14, or an inside bevel 14b as seen in FIG. 2. The parameters of the bevel are of great importance.

The principal object of the staple according to the invention is to provide a staple point configuration which will penetrate light gauge sheet metal without punching out a slug of the sheet metal channel 10. If the taper is too steep and leaves too much of the blunt end of the staple in place, the punching out of the slug will not be eliminated. If the taper is such that insufficient of the blunt end is left, then the staple will simply deflect on top of the sheet metal as though it were hitting the anvil in a conventional desk top stapler.

The elimination of the punched out slugs is highly important from a safety standpoint. These minute slugs will be very hot and can cause serious injury if they hit an operator in the face or in the eye. Thus, the staple of the present invention, instead of punching out a slug, will bend down tabs from the sheet metal channel as indicated at 10a in FIG. 1 or at 10b in FIG. 2. The coaction of the bevel and the resultant punching down of the tabs 10a or 10b also produces a deflection of the legs 14 inwardly toward each other as in FIG. 1, or outwardly away from each other as in FIG. 2, with the tabs 10a bearing against the outsides of the legs in FIG. 1 and the tabs 10b bearing against the inside of the legs in FIG. 2, depending upon whether the bevel is applied to the outsides of the legs as at 14a in FIG. 1 or to the insides of the legs as at 14b in FIG. 2.

Dimensions are indicated in FIGS. 1 and 2 by the pairs of arrows and these dimensions are indicated at A, B and C.

In both the FIGURES, the dimension A is representative of the wire size, and the dimensions B and C will be represented in terms of percentage of A.

The dimensions B must be at least about 25 percent A and not more than about 50 percent A. This of course means that the blunt ends of the staple legs will be from about 50 percent to about 75 percent of the wire size. If the dimension B is less than about 25 percent A, the staple is likely to punch out a slug and thus will not provide the tabs 10a or 10b. If the dimension B is more than about 50 percent A, the legs may deflect on top of the sheet metal 10, either inwardly or outwardly depending upon which side the bevel is provided.

The dimension C (which in effect determines the angle between the blunt end of the leg and the bevel) must not be less than about 50 percent A. The minimum of about 50 percent A is high enough to exceed the shear point of the sheet metal material, which is approximately one-third the thickness of the sheet metal. The maximum dimension for C is dictated primarily by manufacturing difficulties.

There is really no particular choice as between an outside bevel as at 14a and an inside bevel as at 14b. If there is a choice, probably the inside bevel is slightly better than the outside bevel, but the difference is very slight.

If the above described parameters are observed, it has been found by tests that the pull required to withdraw a staple from the sheet metal in pounds varies from about 25 to about 40 pounds, demonstrating the excellent holding power of staples according to this invention when driven through another material into light gauge sheet metal. This holding power is predicated not only upon the bent down tabs 10a or 10b but also upon the converging or diverging configuration of the legs in the "as driven" condition.

The embodiments of the invention in which an exclusive property or privilege is claimed are defined as follows:

1. A structure comprising an element secured to a piece of light gauge sheet metal by means of a staple comprising a drivable U-shaped wire member having legs terminating in piercing ends, the legs of said staple, at their piercing ends, having their outside surfaces beveled, leaving partial blunt points, the length of said bevels axially of said legs being at least about 50% of the wire size and the angle of said bevels being such as to remove between about 25% and about 50% of the wire size at the points, in the "as driven" condition of said staple said legs passing through said element and said piece of light gauge sheet metal securing said element and said light gauge sheet metal piece together in abutting relationship, tabs of said sheet metal being bent down along and bearing against the outsides of the legs of said staple, and the legs of said staple converging toward each other.

2. A structure comprising an element secured to a piece of light gauge sheet metal by means of a staple comprising a drivable U-shaped wire member having legs terminating in piercing ends, the legs of said staple, at their piercing ends, having their inside surface beveled, leaving partial blunt points, the length of said bevels axially of said legs being at least about 50% of the wire size and the angle of said bevels being such as to remove between about 25% and about 50% of the wire size at the points, in the "as driven" condition of said staple said legs passing through said element and said piece of light gauge sheet metal securing said element and said light gauge sheet metal piece together in abutting relationship, tabs of said sheet metal being bent down along and bearing against the insides of the legs of said staple, and the legs of said staple diverging away from each other.

* * * * *